United States Patent [19]

Hopkins et al.

[11] 4,063,365
[45] Dec. 20, 1977

[54] ORIENTATION DETECTION AND ALIGNMENT METHOD AND APPARATUS

[76] Inventors: Evan Leon Hopkins, 11352 Oxford Drive; Evan Lloyd Hopkins, 1701 West 13th St.; Jerry L. Wedel, 705 Peyton, all of Emporia, Kans. 66801

[21] Appl. No.: 480,490

[22] Filed: June 18, 1974

Related U.S. Application Data

[62] Division of Ser. No. 207,829, Dec. 14, 1971, Pat. No. 3,822,944.

[51] Int. Cl.² .................. G01B 5/24; G01B 13/18; G01B 19/80; G01J 1/00
[52] U.S. Cl. ............................. 33/288; 33/335; 356/121
[58] Field of Search ............... 33/288, 335; 356/121, 356/152

[56] References Cited

U.S. PATENT DOCUMENTS

| 764,556 | 7/1904 | Cable | 33/381 |
|---|---|---|---|
| 3,324,564 | 6/1967 | Wright et al. | 33/366 |
| 3,520,618 | 7/1970 | Bentley | 356/121 |
| 3,533,699 | 10/1970 | Hopkins et al. | 356/152 |
| 3,672,063 | 6/1972 | Hopkins et al. | 33/180 L |
| 3,822,944 | 7/1974 | Hopkins et al. | 33/288 |

*Primary Examiner*—Steven L. Stephan
*Attorney, Agent, or Firm*—Burns, Doane, Swecker & Mathis

[57] ABSTRACT

A method and apparatus for detecting orientation with respect to predetermined frames of reference particularly for use in aligning vehicle headlamps relative to frames of reference such as the true horizontal and the longitudinal axis of the vehicle. Orientation relative to the true horizontal is detected by comparing the electrical responses of two photocells which have a peak spectral response at a predetermined wavelength and which bracket a gas bubble provided in an upwardly curved transparent housing containing both the bubble and a fluid. The photocells are illuminated through the housing by associated light emitting diodes which have peak emissivities at wavelengths matched to the peak spectral response of the corresponding photocells. Orientation relative to a predetermined axis such as the axis of the vehicle is detected by detecting the orientation of a planar surface defining two brightness zones relative to a light beam originating at a light source as a concentrated light spot and diverging along the length of the beam. When aiming headlamps, the two orientation detecting means are mounted on a pair of headlamp aiming tools which are retained on the headlamps in a predetermined orientation relative thereto. Signals related to the detected orientation are generated by the orientation detectors and are selectively applied to a headlamp position adjusting means to modify the position of the headlamps in response to the detected orientations. The appropriate orientation signal may be selected automatically in response to the position of the adjusting means.

3 Claims, 11 Drawing Figures

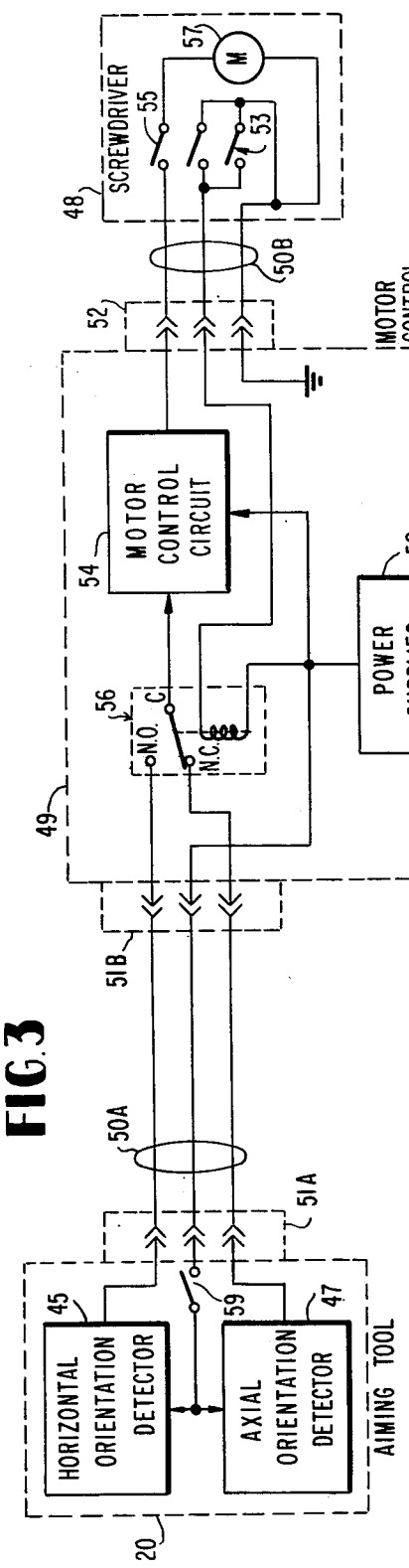
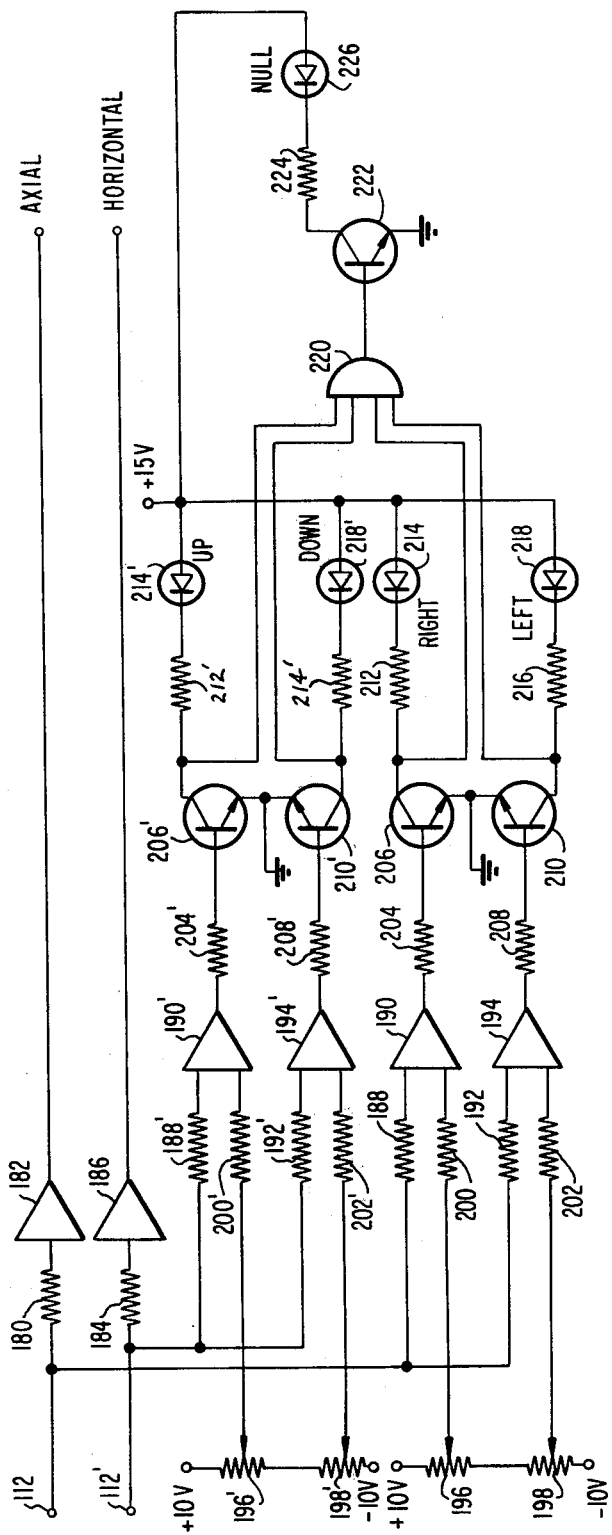
FIG.3
FIG.9

ORIENTATION DETECTION AND ALIGNMENT METHOD AND APPARATUS

RELATED APPLICATIONS

This application is a division of copending application Ser. No. 207,829, filed Dec. 14, 1971 now U.S. Pat. No. 3,822,944.

BACKGROUND OF THE INVENTION

This invention relates to a method and apparatus for automatically detecting orientation with respect to a predetermined reference, particularly for aligning vehicle headlamps, and more specifically relates to a method and apparatus for automatically detecting the orientation of vehicle headlamps in a predetermined frame of reference and for automatically adjusting the headlamps to obtain a desired orientation thereof.

A wide variety of orientation sensing systems and adjusting means have been employed for the alignment of vehicle headlamps and wheels, surveyors' transits and numerous other machines and devices which require accurate alignment relative to a predetermined reference for proper operation. For example, a number of different types of tools have been employed to align vehicle headlamps in order to properly aim the light beams relative to the true horizontal and relative to the longitudinal axis of the vehicle. The importance of this aiming procedure can be readily appreciated when the problems of visibility and glare are considered.

It can be appreciated that a headlamp which is badly misaligned with respect to the true horizontal may point upwardly or downwardly resulting in poor visibility and hazardous or at least annoying glare to drivers of approaching vehicles. Likewise, a headlamp which is badly misaligned relative to the longitudinal axis of the vehicle may point to the left or right of the path of the vehicle again resulting in poor visibility and possible hazardous conditions for approaching vehicles.

The problem of aligning vehicle headlamps has been approached in a number of ways. One method of aiming headlamps requires the alignment of the vehicle relative to a target and the energization of the headlamps for illumination of the target. Another system for aiming headlamps utilizes an aiming tool which is positioned in abutment with aiming pads defining a reference surface on the headlamp. The headlamps are then aligned by determining the orientation of the tool (and, thus the reference surface) relative to the true horizontal and relative to the longitudinal axis of the vehicle.

One such system of this latter type is disclosed in U.S. Pat. No. 2,997,914, to Hopkins assigned to the assignee of the present invention. The headlamp aiming apparatus of the Hopkins patent is highly advantageous since highly accurate alignment is obtained without, for example, the need for elaborate vehicle positioning stalls and the like.

While highly satisfactory results are obtained through the use of the headlamp aiming apparatus disclosed in Hopkins patent, it would be particularly desirable to provide for the more rapid alignment of vehicle headlamps while simultaneously minimizing the possibility of operator error. For example, where vehicles are mass produced at assembly line speeds, it is useful to be able to accurately aim the vehicle headlamps at speeds consistant with these same assembly line speeds. Moreover, where state codes require periodic vehicle inspections, the rapid and accurate testing of vehicle headlamp alignment, and the subsequent realignment of the headlamps if necessary, is highly desirable.

In addition to the alignment of vehicle headlamps, speed and a high degree of accuracy with minimal chance of operator error may be desirable in detecting and adjusting the orientation of other devices relative to predetermined references. For example, the alignment of a surveyor's transit relative to the true horizontal is extremely important if accurate measurements are to be obtained. Moreover, the alignment of the wheels of a vehicle is highly desirable from the standpoint of maximum tire life and safe vehicle operation at relatively high speeds.

It is accordingly an object of the present invention to provide a novel method an apparatus for automatically detecting the orientation of a member relative to a predetermined reference, particularly with respect to the true horizontal.

It is another object of the present invention to provide a method and apparatus for automatically detecting the orientation of a member relative to a predetermined reference and automatically adjusting the orientation of the member in response to the detected orientation.

It is still another object of the present invention to provide a novel method and apparatus for aiming vehicle headlamps.

It is a further object of the present invention to provide a novel method and apparatus for minimizing the possibility of operator error in the aiming of vehicle headlamps.

It is yet another object of the present invention to provide a novel method and apparatus for automatically detecting headlamp aiming errors and for automatically adjusting the headlamps to compensate for the detected errors.

It is still a further object of the present invention to provide a novel method and apparatus for detecting the orientation of a vehicle headlamp relative to the true horizontal and relative to the longitudinal axis of the vehicle and for automatically adjusting the position of the headlamp in response to a selected one of the detected orientations, the selection being accomplished in response to the position of an adjusting tool used to effect the adjustment.

A preferred embodiment of the invention intended to accomplish at least some of the foregoing objects comprises an aiming tool adapted to be retained in engagement with a reference surface on the vehicle headlamp so that the aiming tool is disposed at a predetermined orientation relative to the reference surface and means carried by the aiming tool for detecting the orientation of the tool relative to the true horizontal and the longitudinal axis of the vehicle. A headlamp adjusting means is provided for modifying the position of the vehicle headlamp in response to the detected orientation of the aiming tool to align the headlamp in a desired orientation relative to the true horizontal and the longitudinal axis of the vehicle.

The adjusting means also includes position responsive switch means for selecting the proper orientation detecting means to effect the headlamp adjustment according to the position of the adjusting means. More specifically, a position responsive switch such as a mercury switch carried by the headlamp adjusting means indicates by its position the direction (up/down, right/left) in which the headlamp will be adjusted in response to the application of a control signal thereto.

The position responsive switch, through closure of the proper set of electrical contacts, thereby selects the proper orientation detector for control of the adjusting means.

Another independent aspect of the present invention involves a detecting means including light emitting diodes and photocells, approximately matched as to the wavelengths at which peak emmissivity and spectral response is obtained, used in conjuction with a level means of the type containing two media having different light modifying properties, e.g. a liquid and a gas bubble, to automatically detect the orientation of a member relative to the true horizontal. The level means is desirably constructed so that the bubble position is relatively insensitive to pivotal movement of the level means relative to the true horizontal. The approximate match of the light emitting diodes and photocells results in extremely high sensitivity of the detecting means, thereby compensating for the relative insensitivity of the level means and providing a highly sensitive, very stable automatic orientation detector, the output signal from which may be utilized to indicate, record and/or modify the orientation of the member relative to the true horizontal.

Yet another independent aspect of the present invention involves a detecting means including first and second light detecting means and a light source mounted independently of the detecting means. A wall means defining first and second brightness zones is disposed intermediate the light source and the two light detecting means. The two light detecting means are positioned in the respective brightness zones. The light source illuminates the brightness zones with a light beam originating as a concentrated spot of light and diverging outwardly along the length of the beam.

Other objects and advantages of the present invention will become apparent to one skilled in the art to which the invention pertains from a perusal of the following detailed description of a preferred embodiment of the invention when read in conjunction with the accompanying drawings in which:

THE DRAWINGS

FIG. 3 is an electrical diagram functionally illustrating the electrical circuit elements of the aiming system of FIG. 1;

FIG. 9 is a detailed electrical diagram illustrating another embodiment of the circuit elements mounted in each of the aiming tools of FIGS. 1 and 2.

DETAILED DESCRIPTION

OVERALL SYSTEM

Figure 1:
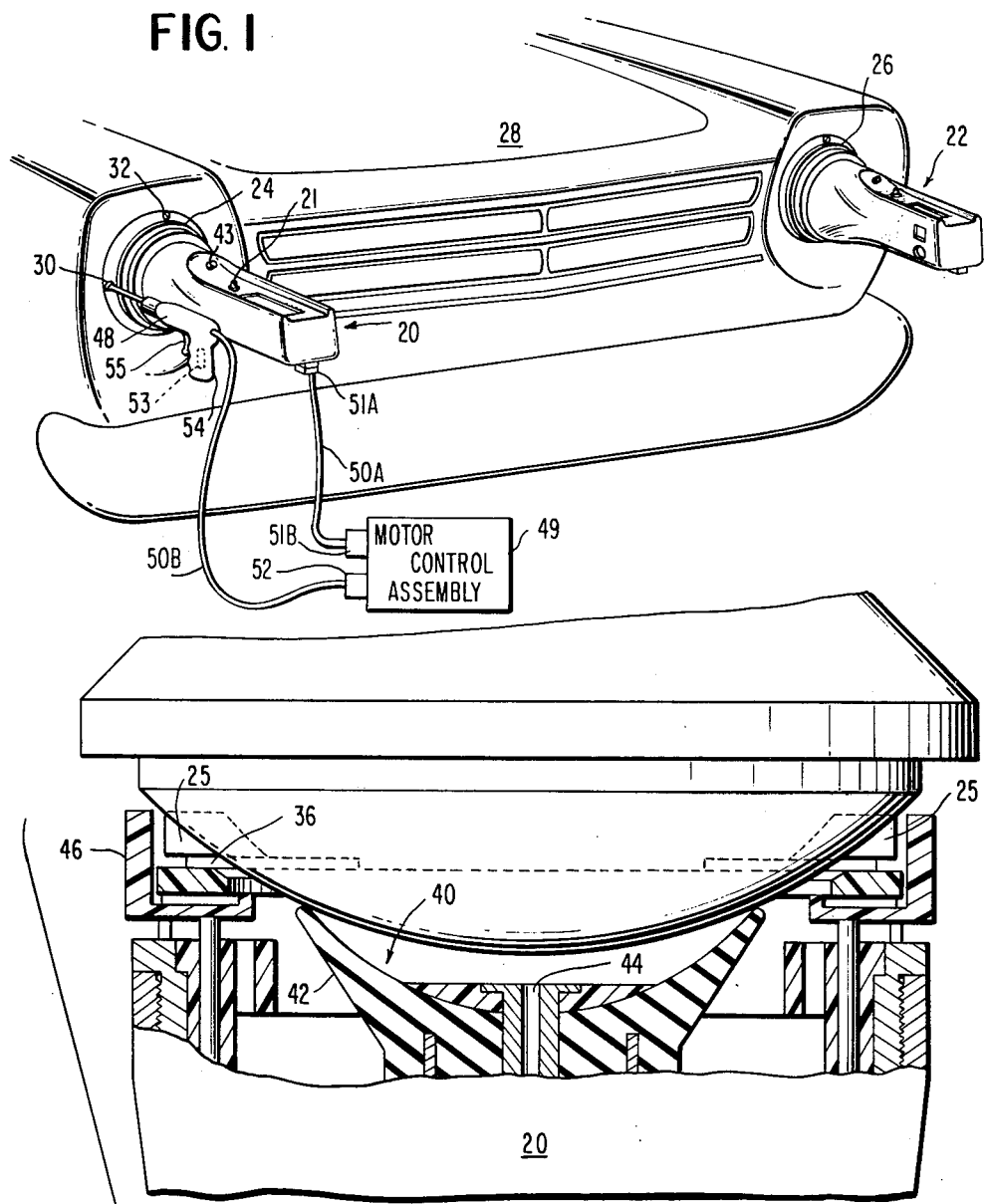
FIG. 1 is a pictorial view of the headlamp aiming system of the present invention as used for aiming vehicle headlamps.
Figure 2:
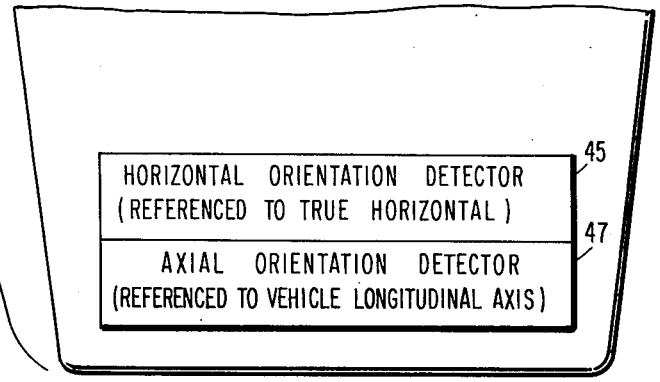
FIG. 2 is a plan view in partial cross section of one of the aiming tools of FIG. 1 attached to a headlamp and schematically showing the horizontal and axial orientation detectors according to the present invention.

With reference to FIGS. 1 and 2, the vehicle headlamp aiming system of the present invention may be seen pictorially and in partial cross section.

A pair of aiming tools 20 and 22 are releasably and securely retained in cooperating relation to the headlamps 24 and 26, respectively, of a vehicle 28. The headlamps 24 and 26 may be of the conventional type, such as those shown in the previously identified Hopkins patent. Each headlamp is provided with aiming pads 25 (FIG. 2) or other means defining an outwardly facing reference surface. On the usual headlamp of this type, three generally coplanar, smooth aiming pads, integral with the lens, are disposed circumferentially around the outer surface of the lens at 120° intervals.

Each of the vehicle headlamps 24 and 26 is adjustably secured to the vehicle 28 in a conventional manner. For example, two-way adjustment of each headlamp may be provided by adjusting screws 30 and 32. The rotation of one adjusting screw 30 causes the headlamps to pivot about a generally vertical axis. In this fashion, alignment of the headlamps with respect to the longitudinal axis of the vehicle 28 is permitted by providing movement of the optical axes of the headlamps in a generally horizontal plane. The rotation of the other adjusting screw 32 causes the headlamps to pivot about a generally horizontal axis extending transversely of the vehicle, thus permitting alignment of the headlamps with respect to the true horizontal, i.e. with respect to a plane tangent to the earth's surface, by providing movement of the optical axes of the headlamps in a generally vertical plane.

Each of the aiming tools 20 and 22 preferably includes an elongate housing or frame 34 adapted to be releasably and securely coupled to the vehicle headlamps through the application of air pressure to an air fitting 21 as will hereinafter be more fully discussed. Each aiming tool is provided with means defining a seating surface which matingly abuts the reference surface of the vehicle headlamp when the tool is properly positioned relative to the headlamp, i.e. when the tool 20 is at a predetermined orientation relative to the optical axis of the headlamp 24 as is shown in FIGS. 1 and 2.

As in the case of the reference surface, the seating surface may be discontinuous in nature and may be formed by a plurality of metallic inserts 36 mounted on an adapter ring 38 as shown in FIG. 2. The metallic inserts 36 each have smooth and coplanar outwardly facing surfaces for abutting the surfaces of the aiming pads 25. The seating surface formed by the metallic inserts is at a predetermined orientation, preferably 90°, relative to the longitudinal axis of the aiming tool 20. This predetermined orientation between the aiming tool axis and the seating surface is, of course, the same as the orientation between the aiming tool axis and the reference surface on the headlamp when the tool is properly mounted on the headlamp. Since the aiming tool axis is disposed at a known orientation relative to the optical axis of the headlamp, the tool provides a reference platform from which the headlamps may be accurately aimed by detection of the orientation of the tool axis relative to any desired frame of reference.

As is shown in FIG. 2, the tool is preferably held in its properly oriented position with the seating surface matingly abutting the reference surface of the vehicle headlamp by means of a vacuum holding assembly including a vacuum cup assembly generally indicated at 40. This vacuum holding assembly is preferably of the type disclosed in U.S. Pat. No. 3,672,063 filed by E. L. Hopkins et al on Jan. 25, 1971, for "Headlamp Aiming Device with Orientation Sensing." This Hopkins et al patent is assigned to the assignee of the present invention and is hereby incorporated herein by reference.

Briefly, the preferred vacuum cup assembly 40 includes a suction cup 42, selectively operable to provide a suction force capable of releasably and securely retaining the headlamp when the seating surface of the aiming tool is properly positioned with respect to the outwardly facing reference surface of the vehicle headlamp. This suction force is preferably generated by a venturi assembly (not shown) which creates a low pressure zone through the action of the air pressure applied thereto via the air pressure fitting 21 (FIG. 1). The low pressure zone communicates with the suction cup 42 through a passage 44 to provide the required suction force. A valve (not shown) manually operable through the depression of a valve button 43 exposes the low pressure zone to atmosphere for release of the tool from the headlamp.

As is disclosed more fully in the Hopkins et al patent, the vacuum holding assembly also includes a sensing means including a sensing ring 46 which is cooperable with the vehicle headlamp for sensing the orientation of the tool with respect to the headlamp. This sensing means prevents the suction holding force applied by means of the suction cup 42 and the passage 44 from reaching a sufficient magnitude to securely retain the tool on the headlamp in response to sensed orientations other than the desired correct orientation of the tool.

As was previously mentioned, the longitudinal or aiming axes of the aiming tools, when properly positioned on the headlamps, are disposed in a predetermined orientation relative to the optical axes of the headlamps, e.g. aligned with the optical axes of the headlamps. The aiming axis may thus be utilized as a reference axis in aligning the headlamps. For this purpose, means (depicted functionally in FIG. 2 at 45 and 47, respectively) are provided in each of the aiming tools 20 and 22 for detecting the orientation of the aiming axis relative to the true horizontal and relative to the longitudinal axis of the vehicle.

With continued reference to FIGS. 1 and 2, it may be seen that orientation signals from the aiming tools may be selectively applied through a multi-conductor cable 50A and suitable connectors 51A and 51B to a motor control assembly depicted functionally at 49 in FIG. 1. The signals from the motor control assembly may be applied to a motor driven screwdriver 48 through a multi-conductor cable 50B and a suitable connector or plug 52. In addition, electrical power required for the operation of the circuits in the aiming tools may be supplied from suitable power supplies in the motor control assembly 49 via the cable 50A and connectors 51A and 51B.

According to the present invention, the orientation signals are selectively applied to the screwdriver motor control circuit depending upon which of the screws 30 and 32 is being adjusted by the operator. In this fashion, the operator need not be concerned with insuring proper input to the screwdriver through manual control of switches and the like. The selective application of the orientation signals from the orientation detectors to the screwdriver motor control circuit is preferably accomplished through the use of a position responsive switch such as a conventional mercury switch mounted in the screwdriver 48 in any suitable manner as is shown schematically at 53 in FIG. 1. The mercury switch is automatically operative to sense the position of the screwdriver and thereby to determine which adjustment is about to be made by the operator. Thus, with the screwdrive in engagement with the adjusting screw 30, one set of electrical contacts may be closed while another set of contacts may be closed with the screwdriver in engagement with the adjusting screw 32. Alternatively, a single set of contacts may be provided at the upper end of the mercury switch so that a relay is energized in one position of the screwdriver and deenergized in the other position.

For example, the housing of the screwdriver 48 may be shaped so that it is necessary to tilt the handle 54 approximately 90° from the position illustrated in FIG. 1 to engage the adjusting screw 32. The position responsive switch 53 may thus automatically select the signal from the proper orientation detector for application to the screwdriver motor control circuit in response to screwdriver position as is subsequently described in greater detail in connection with FIG. 3. When the screwdriver is energized by operator closure of a control switch such as the switch 55 on the screwdriver handle 53, a closed servo loop formed by the screwdriver, the headlamp, the selected orientation detector and the screwdriver motor control assembly is operative to essentially null any aiming errors relative to the selected frame of reference.

To facilitate the adjustment of the headlamps with the screwdriver 48 and still permit the automatic selection of the orientation signals in accordance with screwdriver position, two position responsive switches may be utilized. The switches may be elongated mercury switches mounted in the screwdriver, oppositely inclined at 45° angles to a vertical plane containing the longitudinal axis of the screwdriver.

The mercury switches each may have two sets of electrical contacts, one set being provided at each end of the switch housing. With the screwdriver tilted less than 45° relative to the vertical, the lower sets of contacts are electrically connected through the mercury, completing one electrical path through each switch. These lower contacts may thus be connected in series between the axial orientation detector and the motor control circuit thereby electrically connecting these circuits when the screwdriver is upright or tilted less than 45° relative to the vertical. With the screwdriver tilted at an angle of more than 45° relative to the vertical in either direction, the upper contacts of at least one of the two switches are electrically connected. By connecting the upper contacts in parallel between the horizontal orientation detector and the motor control circuit, these circuits are electrically connected through at least one set of switch contacts when the screwdriver is tilted more than 45°. Simultaneously, the axial orientation detector is disconnected from the motor control circuit since the two sets of lower switch contacts are connected in series and one set necessarily opens when the screwdriver is tilted more than 45°.

Since the connections between the screwdriver and the aiming tool may desirably include very long conductors, the application of the orientation signals through the mercury switches themselves may necessarily require an extremely long signal path resulting in noisy signals due to stray signal pickup. It may thus be advantageous to use a single set of electrical contacts at the upper ends of each mercury switch to control the energization of a relay in the signal path. (see FIG. 3)

For example, a set of normally closed contacts of a conventional reed relay 56 may be connected in series between the axial orientation detector and the motor control circuit 54 as is shown in FIG. 3. When the screwdriver 48 is positioned on the adjusting screw 30, the contacts at the upper ends of the mercury switches (shown schematically at 53 in FIG. 3) in the screwdriver 48 are open and the coil of the relay 56 is deenergized connecting the axial orientation detector 47 to the motor control circuit 54. When the screwdriver is positioned on the adjusting screw 32, the screwdriver handle is necessarily tilted more than 45° from the vertical and at least one set of the contacts of at least one switch 53 is closed, energizing the relay 56 and connecting the horizontal orientation detector 45 to the motor control circuit 54.

With continued reference to FIG. 3, the sensing and control portions of the headlamp aiming system of the present invention may be more fully understood through the functional illustration thereof. The orientation detectors carried by each of the aiming tools 20 and 22 include the horizontal orientation detector 45 and the axial orientation detector 47 previously mentioned in connection with FIG. 2. These orientation detectors 45 and 47 are disposed in predetermined relation to the aiming axis of the associated tool and are operative respectively to detect the orientation of the aiming axis relative to the true horizontal and the longitudinal axis of the vehicle.

Signals generated by the horizontal and axial orientation detectors 45 and 47 are applied through the connectors 51A and 51B and the cable 50A to the motor control assembly 49. These signals may then be selectively applied to the motor control circuit 54 through the contacts of the relay 56 in response to the position of the position responsive switch 53 in the screwdriver 48 as was previously described. Alternatively, if the relay 56 is not employed, both signals may be applied through the connector 52 and the cable 50B directly to the position responsive switch 53 in the screwdriver assembly 48. Then the detector signal selected by the position responsive switch 53 may be returned through the cable 50B, the connector 52 to the screwdriver motor control circuit 54 in the motor control assembly 49.

In either event, an output signal from the screwdriver motor control circuit 54 is applied through the connector 52 and the cable 50B and through the manually closed (but normally open as illustrated) control switch 55 in the screwdriver 48 to the screwdriver control motor 57. An additional connection may be provided between the screwdriver 48 and the motor control assembly 49 to provide a signal return path (common or ground connection) from the screwdriver to the motor control assembly.

As is further illustrated in FIG. 3, the electrical power required by the aiming tool detector circuits and the screwdriver motor control circuit may be provided from suitable battery or electronic power supplies 58 in the motor control assembly 49. It should be noted that while only one lead is shown from the supplies 58 to the various detector and control circuits for the sake of clarity, several different supply voltages may be provided via separate conductors.

In addition to the manually operated switch 55 provided in the screwdriver 48, a manually or vacuum operated switch illustrated at 59 may be provided in each of the aiming tools to prevent application of power thereto until the aiming tools are properly positioned on the headlamps. The switch 59 may be, for example, connected in series with the conductors supplying electrical power to the orientation detectors and may be closed by the vacuum applied to the suction cup assembly 40 (FIG. 2) when the aiming tool is properly secured to the headlamp, thereby effecting automatic energization of the orientation detectors when the aiming tools are securely coupled to the headlamps.

In general, a typical headlamp aiming operation may proceed as follows. Referring to FIGS. 1-3, the vehicle is driven onto a surface having a known orientation relative to the true horizontal. If this orientation is other than exactly parallel to the true horizontal, a preliminary adjustment in the orientation of the horizontal orientation detectors 45 relative to the aiming axes of both aiming tools may be made in a manner hereinafter described.

The orientation of the aiming axis relative to the true horizontal is detected by the horizontal orientation detector 45. Likewise, and at the same time, the orientation of the aiming axis of the tool relative to the longitudinal axis of the vehicle is detected by the axial orientation detector 47. Signals related to the detected orientations are selectively applied to the motor control circuit 54 either through the position responsive switch 53 or through the relay 56 when the screwdriver 48 is positioned in engagement with one of the adjusting screws.

The signal from the orientation detector selected by the position responsive switch in the screwdriver is applied to the screwdriver motor control circuit 49. It will be appreciated that when the operator closes the switch 55, a motor control signal related to the aiming error detected by the selected orientation detector is applied from the screwdriver motor control circuit 54 to the motor 60. This signal drives the motor 56 until the adjusting screw is driven to a position to which nulls any detected aiming errors of the headlamp relative to the selected frame of reference.

The operator then places the screwdriver 48 into engagement with the other adjusting screw and the output signal from the other orientation detector is thus selected for application to the motor control circuit 54. Thereafter, by merely closing the switch 55 the operator aligns the vehicle headlamp relative to the other selected reference plane and the alignment of that headlamp is complete. The operator may then plug the motor control assembly 49 into the other aiming tool for alignment of the other headlamp in this same manner.

ORIENTATION DETECTORS

Axial Detector

Figure 4A:
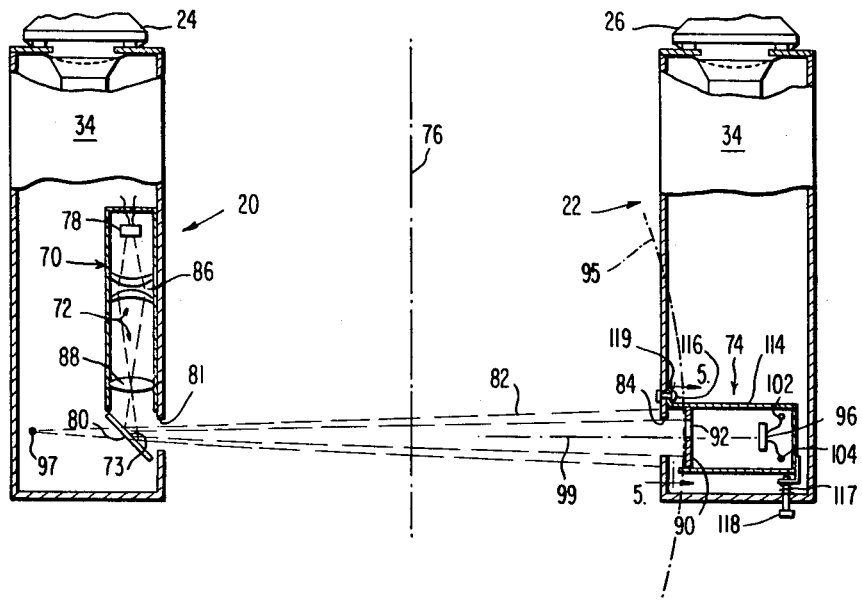
FIG. 4A is a plan view in partial cross section of the aiming tools of FIG. 1 schematically illustrating the axial orientation detector.
Figure 4B:
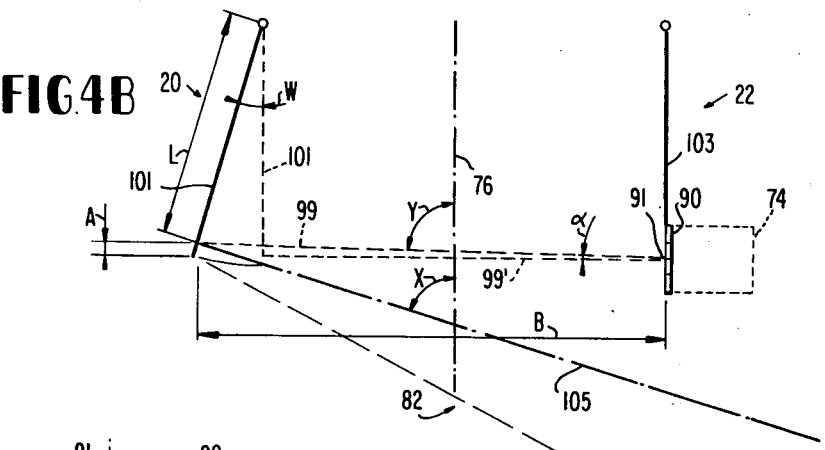
FIG. 4B is a geometrical, schematic representation of the axial orientation detector and aiming tools of FIG. 4A.
Figure 5:
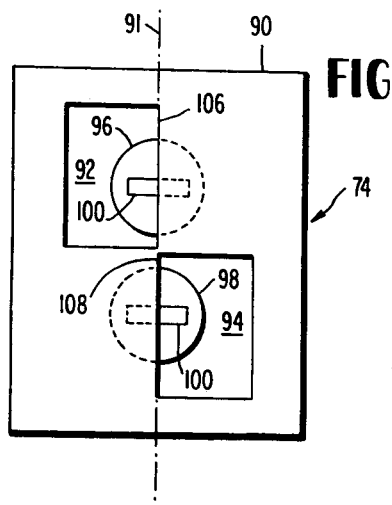
FIG. 5 is a view in elevation of the detector assembly of FIG. 4A taken along the line 5—5.

A preferred embodiment of a system for detecting the orientation of the aiming axis of each aiming tool relative to the longitudinal axis of the vehicle is shown in greater detail in FIGS. 4, 4B and 5.

FIG. 4 shows the aiming tools 20 and 22 in partial cross section as viewed from above when properly positioned on the headlamps 24 and 26 and with the reference surfaces of both headlamps oriented perpendicular to the longitudinal axis of the vehicle. The aiming tool 20 is provided with a light source generally indicated at 70 and the aiming tool 22 is provided with a detector assembly generally indicated at 74. With the aiming tools properly positioned in abutment with the reference surfaces on the headlamps, light from the light source 70 in the tool 20 communicates through apertures 81 and 84 in the respective tool housings with the detector assembly 74 in the tool 22 to provide a means for detecting the orientation of the optical axis of the headlamp 26 relative to the longitudinal axis 76 of the vehicle. Likewise, an identical light source 70 (not shown) mounted in the aiming tool 22 and an identical detector assembly 74 (not shown) mounted in the aiming tool 20 communicate to provide a means for detecting the orientation of the optical axis of the headlamp 24 relative to the longitudinal axis 76 of the vehicle.

Each light source 70 may include a lamp 78 or other suitable source of illumination such as a light emitting semiconductor, a lens system 72 and a reflector 80. Power may be supplied to the lamp 78 from a suitable power source through a suitable ON/OFF switch (not shown). Light emitted by the lamp 78 is focused onto the reflector 80 by the lens system 72 as a bright, concentrated spot or image 73 and is reflected normal to the aiming axis to the tools 20 through an aperture 81 in the aiming tool housing toward the aiming tool 22 as a conical, diverging beam indicated at 82.

At least a portion of the beam 82 enters the aperture 84 in the housing 34 of the aiming tool 22 and strikes the detector assembly 74. The sharply focused light at the reflector 80 appears to the detector 74 as a strong, concentrated light image thus producing sharp shadows at the detector 74. The divergence of the beam 82 permits alignment of the aiming tool 22 even if either or both of the tools 20 or 22 is badly canted with respect to the longitudinal axis 76 of the vehicle as will be explained in greater detail hereinafter.

To provide the desired spot 73 and beam 82 characteristics, the lens system 72 preferably includes a light condensing lens system 86 such as the illustrated concavo-convex lenses and an object lens 88 such as the illustrated convexo-convex lens. These lenses are spaced in a well known manner along the light source 70 housing to produce the desired concentrated image and the desired diverging, conical beam 82. Other suitable conventional lenses may be utilized or the spacing of the lenses may be varied to vary the size of the light spot as desired. Lenses of this type are themselves conventional and will therefore not be described in detail herein.

As shown in FIGS. 4A and 5, the detector assembly 74 preferably comprises a shadow box type detector arrangement in part similar in operational principles to that disclosed in Hopkins et al U.S. Pat. No. 3,533,699 the disclosure of which is hereby incorporated by reference. The detector assembly is, however, mounted independently of the conical beam source, i.e. the concentrated spot 73 is produced in one tool and the detector assembly is in the other tool. Each detector assembly 74 includes an opaque wall 90, preferably dark in color, and two brightness zones 92 and 94 defined by apertures through the opaque wall 90 and preferably symmetrically disposed on opposite sides of a generally vertical axis 91 along the wall 90.

Two light detectors 96 and 98 are suitably mounted behind the opaque wall 90, spaced therefrom and preferably in generally vertical alignment with each other. The light detectors 96 and 98 are positioned generally in alignment with the respective brightness zones 92 and 94 (see FIG. 5) so that the portion of the light beam 82 entering the aperture 84 strikes approximately the same surface area of each of the light detectors 96 and 98 when a predetermined alignment exists between the wall 90 of the detector assembly and the conical beam 82.

Because of the conical shape of the beam 82, this predetermined alignment between the wall 90 and the beam 82 will exist when any direct ray 99 of the light beam 82 striking the axis 91 along the wall 90 is essentially perpendicular to the wall 90, i.e. when the axis 91 along the wall 90 is essentially tangent to a circle 95 having its center at the apex 97 of the cone formed by the conical beam 82. Insofar as the separation distance between the two headlamps (approximately 5 feet) greatly exceeds the distance of the diverging, conical beam source of the detector assembly from their respective associated headlamps (approximately 18 inches), any canting of the aiming tool which carries the conical beam source has little effect on the accuracy of the alignment achieved using the detector assembly carried by the other aiming tool.

This relationship between the light source and the aiming tool 20 at one side of the vehicle and the detector assembly in the aiming tool 22 at the opposite side of the vehicle may be more clearly understood with reference to the geometric representation of FIG. 4B.

Referring now to FIG. 4B, only the aiming axes 101 and 103 of the respective aiming tools 20 and 22 have been shown in this geometrical representation for the sake of clarity. It can be seen that the conical beam 82 originates at the aiming tool 20 as a sharply focused, concentrated light spot and diverges along the length thereof, i.e. proceeding from the source to the detector.

Assuming that the aiming tool 20 is badly canted relative to the longitudinal axis 76 of the vehicle as represented by the angle W, the central axis 105 of the beam 82 will assume an angle X relative to the longitudinal axis 76 of the vehicle. This angle is, of course, equal to 90° minus the angle W. However, a direct ray 99 between the conical beam source and the axis 91 running along the surface of the opaque wall 90 of the light detector assembly will cross the longitudinal axis 76 at an angle Y. The angle Y will be much closer to 90° than the angle X and will be equal to 90° minus the angle alpha ($\alpha$) between the direct ray 99 and a direct ray 99' originating from the conical beam source when the aiming tool axis 101 is parallel to the longitudinal axis 76.

Since the signal from the detector assembly 74 will be zero when the wall 90 is essentially perpendicular to the direct ray 99 it can be seen that the alignment of the tool 22 relative to the longitudinal axis 76 depends upon the size of the angle Y. This in turn depends upon the angle $\alpha$ which is the aiming error imparted to the aiming tool 22 due to the canting to the aiming tool 20.

With continued reference to FIG. 4B, it can be seen that the angle alpha can be approximated by the following equation:

$$\alpha \approx \sin^{-1} \frac{A}{B} \qquad (1)$$

The distance B is equation (1) is approximately equal to the distance between the aiming tools 20 and 22, i.e. the spacing between the headlamps on opposite sides of the vehicle. The distance A may be approximated by the following equation:

$$A \approx 2L(\sin \frac{W}{2})^2 \quad (2)$$

Combining equations 1 and 2, it can be seen the angle alpha is approximately given by the following equation:

$$\alpha \approx \sin^{-1} \frac{2L}{B} (\sin \frac{W}{2})^2 \quad (3)$$

From equation (3) above, the angle alpha may now be approximated for a given angle W where, for example, the distance L essentially between the headlamp and the light source and the distance B essentially between the two aiming tools are both known values. For example, assuming that L is equal to 18 inches, the distance B is equal to 5 feet and the angle W is equal to 5° it can be determined from equation (3) that the angle alpha is less than 0.1°. Thus, even under adverse conditions, the aiming tool 22 can be accurately aligned relative to the longitudinal axis 76 of the vehicle since, even when the aiming tool 20 is badly canted relative to the longitudinal axis 76, a direct ray 99 from the conical beam source appears to the detector assembly to be essentially referenced to the longitudinal axis 76 of the vehicle.

The existance of the predetermined alignment between the light beam and the wall 90 causes substantially identical electrical responses of the light detectors while all other alignment relationships between the wall 90 and the beam 82 cause different responses of the light detectors 96 and 98. As will be subsequently described, the electrical responses of the detectors 96 and 98 may thus be utilized to properly orient the headlamps relative to the longitudinal axis of the vehicle.

The detectors 96 and 98 may be suitable light detector such as, for example, type CL 907 HL photoconductive cells available from Clairex Electronics Inc. Each photocell desirably includes a linerally responsive, light sensitive strip 100 across and outwardly facing surface. This light sensitive strip 100 varies the resistance between the output terminals 102 and 104 (FIG. 4) of each photocell in response to variations in the amount of light striking the strips.

The photocells 96 and 98 are positioned so that the light sensitive strips 100 are perpendicular to the respective vertical edges 106 and 108 of the associated brightness zones 92 and 94 and so that approximately one-half of each strip is exposed in the brightness zone while the other half is shielded by the wall 90. In this manner, approximately identical electrical responses of the photocells results when the light beam 82 is directed onto the wall 90 and strikes approximately equal portions of the photocells.

Figure 4C:
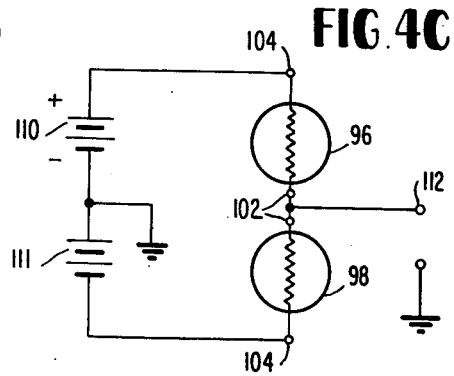
FIG. 4C is a schematic diagram of a preferred circuit for generating a signal related to the detected orientation of the aiming tool.

The electrical characteristics of the two photocells 96 and 98 may thus be utilized to generate a signal related to the orientation of the wall 90 of the detector assembly 74 relative to the light beam 82 by comparing the responses of the photocells. For this purpose a bridge circuit as is illustrated in FIG. 4C may be utilized. than the resistance of the photocell 98, a negative signal appears on the output terminal 112. On the other hand, if the resistance of the photocell 96 is less than the resistance of the photocell 98, a positive signal will appear on the output terminal 112.

With continued reference to FIGS. 4A and 5, it will be apparent that since the wall 90 is at a known orientation relative to the aiming axis of the tool 22, the signal generated by the bridge circuit of FIG. 4C responsively to the comparison of the electrical characteristics of the photocells 96 and 98 is related to the orientation of the aiming axis of the tool 22 relative to the longitudinal axis 76 of the vehicle. Assuming that the wall 90 is parallel to the aiming axis of the tool 22, the electrical responses of the photocells 96 and 98 will be identical when the aiming axis of the tool 22 is parallel to the longitudinal axis of the vehicle.

As will hereinafter be described in greater detail, the output signal from the axial orientation detector 47 will thus be zero when this relationship between the axis of the vehicle and the aiming axis the tool 22 is achieved. Therefore, no drive signal will be applied to the screwdriver 48 when it is positioned on the adjusting screw 30. However, if the aiming axis of aiming tool 22 is oriented other than at the desired orientation relative to the axis of the vehicle an output signal related to the angular error will be applied to the screwdriver 48 of FIG. 1 to align the headlamp until the detector of the aiming tool 22 indicates a proper position.

It may be desirable to align either or both of the headlamps 24 and 26 at a slight angle relative to the longitudinal axis 76 of the vehicle. For example, state vehicle codes may require that the headlamp 26 point inwardly toward the longitudinal axis 76 of the vehicle at an angle or 2° or 3° relative thereto. To provide for such requirements, the opaque wall 90 of the detector assembly 74 of FIG. 4 may be adjustably mounted in the housing 34 of the aiming tool. For example, the wall 90 and the photocells 96 and 98 may be securely mounted in a housing 114 and the housing 114 may be pivotally mounted for rotation about a vertical axis indicated at 116. The housing 114 may be resiliently biased by a spring 117 against an adjusting screw 118. The angular orientation of the opaque wall 90 relative to the aiming of the aiming tool 22 may therefore be adjusted by rotating the adjusting screw 118.

While the pivotal mounting of the detector assembly 74 may be any conventional mounting suitable for this purpose, the sheet metal housing of the detector assembly 74 is preferably bent to provide a flange 117 which is secured to the housing 34 of the aiming tool. In this way, the detector assembly can pivot about the bend forming the flange 117 while being securely held against lateral or other undesired movement.

In this manner, the entire detector assembly 74 may be precisely rotated 2° or 3° as required by vehicle codes so that when a null is obtained from the detector assembly 74, the aiming axes of the aiming tool 22 and therefore the optical axis of the headlamp 26 will be positioned at the predetermined desired orientation, correspondng to the amount of rotation of the detector assembly with respect to the longitudinal axis 76 of the vehicle, relative to the longitudinal axis of the vehicle.

Horizontal Detector

Figure 6:
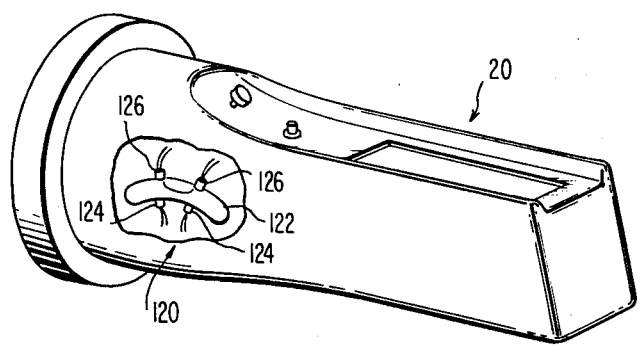
FIG. 6 is a perspective view of one of the aiming tools of FIG. 1 generally illustrating the horizontal orientation detector of the present invention.
Figure 7:
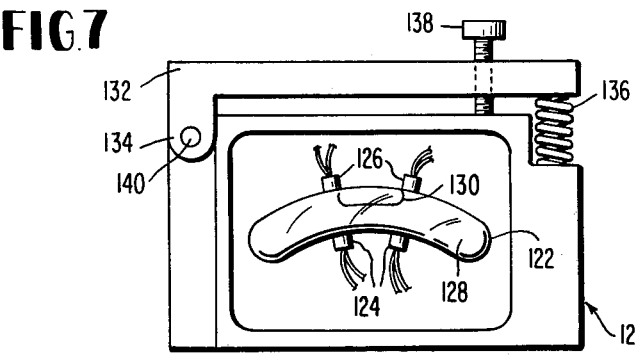
FIG. 7 is a view in elevation of the horizontal orientation detector of FIG. 6; and, FIG. 8 is a detailed electrical diagram illustrating the electrical circuit elements of the system of FIGS. 1–7.

A preferred embodiment of a system for detecting the horizontal orientation of the tools, i.e. the orientation of the aiming axis of each tool relative to the true horizontal, is illustrated in greater detail in FIGS. 6 and 7.

Referring now to FIG. 6, each of the aiming tools 20 and 22 includes a horizontal detector assembly 120 for detecting the orientation of the longitudinal axes of the aiming tool relative to the true horizontal and for providing signals for vertical adjustment of the headlamps. The horizontal detector assembly 120 generally includes an elongated, curved housing 122 containing two media having different light modifying properties. A pair of spaced slight sources 124 and a pair of spaced light detectors 126 each associated with one of the sources and each matched in spectral response to the sources 124 are also included in the assembly 120, as will hereinafter be described in greater detail.

As is shown in greater detail in FIG. 7, the housing 122 is preferably a transparent, glass housing which is generally circular in cross section. The housing 122 is upwardly curved on a predetermined radius and the two media contained thereby are preferably a liquid generally indicated at 128 and a gas bubble indicated at 130. This type of level sensor is similar to well known bubble levels utilized to indicate the position of an object or member relative to the horizontal. However, the radius of curvature of the housing 122 is relatively small in order to make the assembly relatively insensitive, i.e., relatively slow acting, to changes in the orientation between the housing 122 and the true horizontal. For example, the radius of curvature of the housing 122 is preferably between 3/4 and 10 inches providing a movement of the bubble 130 relative to a predetermined fixed position on the housing of approximately 0.013 to 0.175 inches for every degree of angular movement of the housing relative to the true horizontal. For example, a bubble length of one inch permits detection of approximately 77° misalignment of the detector assembly with a housing radius of 3/4 inch and 5.7° misalignment with a housing radius of 10 inches. Since very little movement of the bubble results when the horizontal orientation detector is displaced from the true horizontal, the bubble length need not be excessive to provide the range of adjustment which may be encountered in numerous applications. It wil be appreciated, however, that the bubble length should be sufficient to prevent the bubble from moving entirely out of the zone bracketed by the detectors 126 during an alignment operation.

The relative insensitivity of the detector assembly 120 is desirable since movement of the bubble 130 in response to a change in the horizontal orientation of the housing 122 quickly settles out, minimizing hunting of the closed loop horizontal orientation system. However, this desirable insensitivity of the bubble level assembly is, according to the present invention, coupled with a highly sensitive detection of the bubble position relative to predetermined fixed points on the housing. In this fashion operatively efficient and accurate headlamp alignment may both be achieved.

To compensate for relative insensitivity of the bubble level, the two light sources 124 are selected so that they each have a peak emissivity at a predetermined wavelength of light, and at the same time, the light detectors are selected so that they each have a peak spectral response matched at approximately that same determined wavelength. For example, the light sources 124 may be type FLU 100 solid state lamps, i.e. light emitting diodes available from Fairchild Camera and Instrument Corporation. This type of diode provides a point source of light, has a peak emissivity at a wavelength of about 6,500 Angstroms, consumes very little power and produces negligible heat.

The light detectors 126 may be, for example, type CL 907 HL photoconductive cells available from Clairex Electronics, Inc. As was previously mentioned, this type of photocell has a peak spectral response to light at a wavelength of about 6,150 Angstroms thereby providing a match of the detector spectral response to the light source peak emissivity of less than 6% of the light source peak emissivity. Satisfactory results are envisioned to be obtainable with a difference between these two values of about 0 to b 25% of the wavelength at the light source exhibits peak emissivity. Because of this matching of the detectors to the light sources, the detectors 126 are highly sensitive to any changes in the amount of light reaching their surfaces from the sources 124.

The detectors 126 and the light sources 124 are preferably positioned in abutment with the housing 122 thereby eliminating the need for any additional lens systems. Light from the sources 124 passes through the housing 122 and through the media therein and strikes the associated detectors 126. When only the liquid 128 or equal amounts of the liquid and the air bubble are disposed intermediate the source 124-detector 126 pairs, the light from the sources 124 is focused onto the associated detectors 126 causing identical illumination of the detectors 126. However, if the air bubble 130 is wholly or partially disposed intermediate only one of the detectors 126 and its associated light source 124, the light from the source 124 is diffused by the air bubble thereby causing less illumination of that one detector 126.

The detectors 126 and the light sources 124 are positioned along the housing 122 so that the paths of the light beams from the sources to their associated detectors bracket the bubble 130 i.e. are spaced by approximately the length of the bubble, when the bubble is in a predetermined position indicating that the housing 122 is parallel to the true horizontal. Thus, as long as the detector assembly 120 remains parallel to the true horizontal, light from both sources 124 passes through the housing 122 and strikes the detectors 126 with equal intensities. In this bracketing position, the light emitted by each of the sources 24 causes substantially identical responses of the associated detectors 126 causing a zero output signal from a bridge circuit which may be identical to the circuit described in connection with FIG. 4B. However, when the bubble 130 moves to either side indicating that the detector assembly 120 is in an orientation other than the desired orientation relative to the true horizontal, light from the sources 124 passes unequally through the housing 122 and the media therein causing different responses of the two detectors 126 and providing a signal for application to the screwdriver motor controls circuit 64 of FIG. 3.

As was previously described, the Clairex type CL 907 HL photocells are each provided with a linearly responsive, photosensitive strip along an outwardly facing surface thereof. The photocells may be positioned may be positioned with this strip running lengthwise along the length of the housing 122. Thus, the difference between the electrical responses of the two photocells 126, i.e. the output signal from the bridge circuit which generates the horizontal orientation signal, is essentially linearly related in magnitude to the amount of misalignment of the bubble relative to the detectors over at least a portion of the travel of the bubble within the housing. The output signal from the bridge circuit is thus related in magnitude and sign to the amount and direction respectively of the angular deviation between the horizontal orientation detector assembly and the horizontal. This linear relationship between signal magnitude and angular deviation is particularly advantageous when an indication of the amount of angular deviation is desired as will subsequently be discussed in greater detail.

With continued reference to FIGS. 7, the horizontal detector assembly 120 is adjustably mounted within the housing 34 of each of the aiming tools. A support member 132 may be securely mounted in the housing 34 generally parallel to the longitudinal axis of the aiming tool. The detector assembly 120 is pivotally connected to one end 134 of the support member 132 and is resiliently connected to the other end 135 of the member 132 by a spring 136. An adjusement screw 138 is threaded through the member 132 and abuts the housing of the detector assembly 120 so that rotation of the screw 138 causes pivotal movement of the detector assembly 120 (against the bias of the spring 136) about a generally horizontal axis 140 relative to the member 132 and therefore relative to the aiming axis of the aiming tool. Predetermined offsets of the detector assembly relative to the aiming axis of the tool may thereby be effected to compensate, for example, for deviations from the true horizontal of the surface upon which the vehicle is positioned during the aiming operation.

MOTOR CONTROL AND ALIGNMENT INDICATOR CIRCUITS

Figure 8:
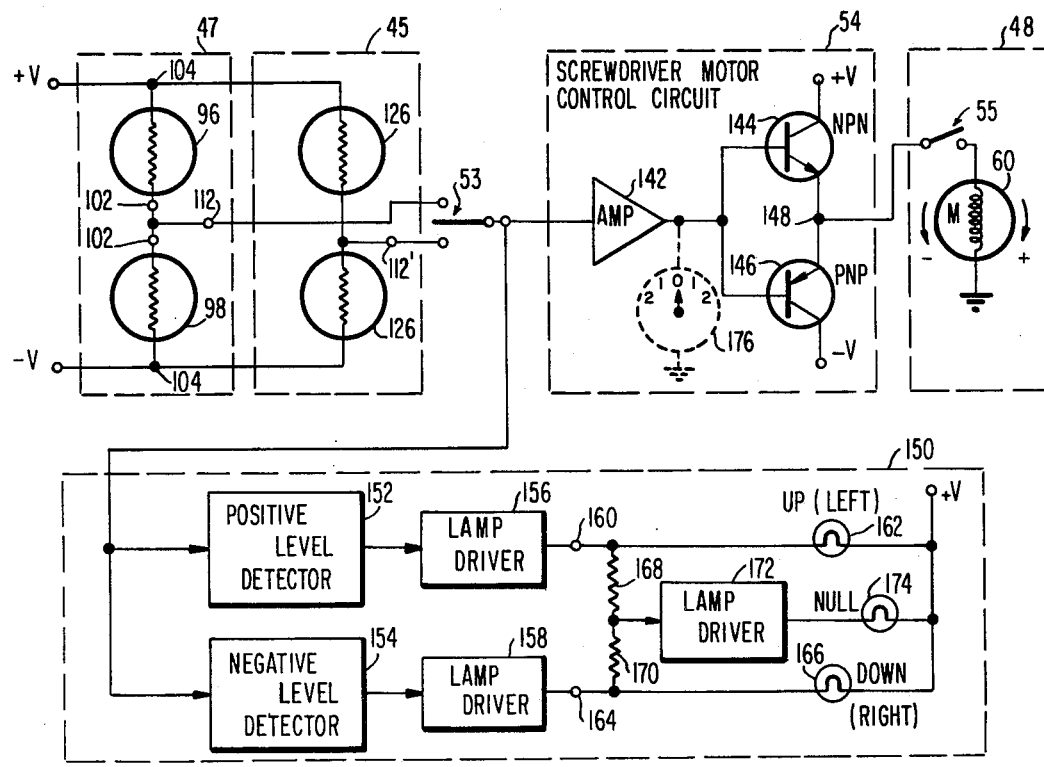

An embodiment of a circuit that may be employed for controlling the screwdriver 48 to adjust the vehicle headlamps in response to the detected orientations thereof is illustrated schematically in FIG. 8.

Referring now to FIG. 8, the photocells 96 and 98 and the photocells 126 and 126 of the respective axial and horizontal orientation detectors 47 and 45 are arranged in identical bridge circuits as was previously described in connection with FIG. 4B. The output signals from the photocell junctions are electrically connected to two contacts of the position responsive switch 53 (or the position responsive switch controlled relay 56) and the signals are selectively applied through the relay contacts or the switch to the screwdriver motor control circuit 54 as was previously described in connection with FIG. 3.

The selected orientation signal is amplified by a linear d.c. amplifier 142 and the output signal from the amplifier 142 is applied to the base electrodes of both a conventional NPN and a conventioanl PNP transistor. A positive d.c. potential is applied to the collector electrode of the NPN transistor and a negative d.c. potential is applied to the collector electrode of the PNP transistor.

The emitter electrodes of the two transistors 144 and 146 are connected together at a junction 148. A motor control signal developed at the junction 148 of the transistor emitter electrodes is applied through the normally open motor control switch 55 and through the d.c. screwdriver motor 56 to ground.

In operation, the position responsive switch 53 selects the output signal from the proper orientation detector as was previously described. This selected orientation signal is applied to the amplifier 142. The signal and amplitude of this orientation signal indicates the magnitude and direction of the aiming error of the headlamp in the selected reference frame. For example, a positive 0.5 volt signal from the horizontal orientation detector 45 may indicate that the headlamp aiming axis must be lowered 2°. This positive signal selected in response to the position of the screwdriver 48 on the vertical adjusting screw 32, is amplified by the amplifier 142 and triggers the NPN transistor 144 into conduction effectively applying the positive voltage V to the junction 148. When the switch 55 is closed by the operator, this positive voltage is applied to the motor 56 causing the screwdriver motor to drive in a direction such that the headlamp optical axis is lowered by turning of the adjusting screw 32. When the headlamp has been lowered sufficiently to null the output signal from the horizontal orientation detector 45, i.e. sufficiently to produce identical electrical responses of the photocells 126, the NPN transistor 144 ceases conduction removing the positive potential from the motor 56.

Likewise, a negative output signal from the horizontal orientation detector 45 may indicate that the headlamp is pointing excessively downward and must be raised. The amplified negative signal triggers the PNP transistor 146 into conduction thereby applying the negative potential on its collector electrode to the junction 148. When the switch 55 is closed, the negative potential at the junction 148 drives the motor 56 in the opposite direction causing the headlamp to pivot upwardly by screw adjustment to null this negative error signal.

It may also be desirable to provide a means for indicating when aiming errors exist and when the desired alignment exists. For this purpose, an indicator circuit 150 such as the one shown in FIG. 8 may be provided.

With continued reference to FIG. 8, the orientation signal selected by the position responsive switch 53 may be applied to both a positive level detector 152 and a negative level detector 154. These level detectors may be, for example, threshold devices such as Schmitt trigger circuits which provide positive output signals when the signal level applied thereto exceeds a predetermined threshold level (a positive threshold level in the case of the detector 152 and a negative threshold level in the case of the detector 154).

The output signal from the positive level detector 152 is applied to a lamp driver 156 and the output signal from the negative level detector 154 is applied to a lamp driver 158. The output terminal 160 of the lamp driver 156 is connected to one terminal of a lamp 162 and the other terminal of a lamp 162 is connected to a positive d.c. potential. The output terminal 164 of the lamp driver 158 is connected to one terminal of a lamp 166 and the other terminal of the lamp 166 is connected to the positive d.c. source.

Two resistors 168 and 170 are connected in series between the output terminals 160 and 164 of the lamp drivers 156 and 158. The resistor 168-resistor 170 junction is conncceted to the input terminal of a lamp driver 172 and the output terminal of that lamp driver 172 is connected through a green indicator lamp 174 to the positive d.c. source.

In operation, the selected orientation signal is applied to both the positive level detector 152 and the negative level detector 154. If, for example, this signal exceeds a predetermined positive level, the positive level detector 152 generates an output signal which energizes the lamp driver 156, grounding the lamp driver 156 output terminal 160, causing current to flow from the positive source through the lamp 162, and lighting the red lamp 162. Current also flows from the positive source through the lamp 166 and the resistors 170 and 168 back to the terminal 160. The values of the resistors 168 and 170 are, however, sufficiently large to limit current flow through the lamp 166 below the value necessary to light this lamp. However, a positive signal is developed at the resistor 168-resistor 170 junction and the lamp driver 172 (which is to indicate a no error condition when lighted) is inhibited from turning on.

If the selected orientation signal exceeds a predetermined negative level, the lamp driver 158 is energized and the lamp 166 lights. Once again, a positive signal is developed on the resistor 168-170 junction inhibiting the lamp driver 172.

When the signal from the selected orientation detector is zero, neither level detector 152 and 154 is energized and the lamps 162 and 166 remain de-energized. When this is the case, the signal at the resistor 168-resistor 170 junction is zero and the lamp driver 172 is energized lighting the green lamp 174. Thus, the green lamp 174 indicates that a null condition exists in the selected reference frame.

As is depicted in phantom in FIG. 8, a suitable, conventional voltmeter 176 or other suitable electrical meter calibrated in degrees may be employed to provide an indication of the amount and direction of the detected angular orientation error. For example, the output signal from the amplifier 142 may be applied to the meter 176 to provide the desired indication. However, since the output signals from the orientation detectors 45 and 47 are related in amplitude and sign to the magnitude and direction of the detected orientation errors, it may be desired to apply these signals directly to the meter 176 for maximum linearity of the indication of orientation errors.

While the signals from the horizontal and axial orientation detectors 45 and 47 are shown in FIG. 8 as being directly applied to the screwdrive motor control circuit 54 in FIG. 8, it may be desirable to amplify these signals prior to applying the signals to the screwdriver motor control circuit through the long and perhaps lossy cable leading from the aiming tool to the screwdriver motor control assembly 49. In addition, it may be desirable to provide indicators such as lights on the aiming tool itself as an aid to the operator in aiming the headlamps.

As is illustrated in FIG. 9, the output signal from the output terminal 112 of the axial orientation detector 47 may be applied through a current limiting resistor 180 to a suitable conventional linear d.c. amplifier 182 for amplification prior to application to the motor control circuit 54 of FIG. 8. The output signal from the output terminal 112' of the horizontal orientation detector of FIG. 8 may be applied through a current limiting resistor 184 to a suitable conventional linear d.c. amplifier 186 for amplification prior to application to the motor control circuit 54 of FIG. 8.

In addition, the signal from the output terminal 112 of the axial orientation detector may be applied through a current limiting resistor 188 to a suitable conventional voltage comparator or level detecting amplifier 190 and through a current limiting resistor 192 to a second conventional voltage comparator or level detecting amplifier 194. A variable, positive reference signal from the arm of a potentiometer 196 connected in series voltage dividing relation with a second potentiometer 198 may be applied through a current limiting resistor 200 to the reference input terminal of the comparator 190. A negative reference signal from the arm of a potentiometer 198 may be applied through a current limiting resistor 202 to the reference input terminal of the comparator 194.

The output signal from the comparator 190 may then be applied through a current limiting resistor 204 to the base electrode of a conventional NPN transistor 206 and the output signal from the comparator 194 may be applied through a current limiting resistor 208 to the base electrode of a second NPN transistor 210. The emitter electrodes of the transistors 206 and 210 may be connected to ground and the collector electrodes may be connected, respectively, through a current limiting resistor 212 and a light emitting diode 214, and a current limiting resistor 216 and light emitting diode 218, to a positive 15 volt d.c. source.

The output signal from the output terminal 112' of the horizontal orientation detector 45 of FIG. 8 may be applied to a circuit identical to that which may be used to indicate axial orientation. This circuit is illustrated in FIG. 9 with like electrical components having the same numerical designations as utilized in describing the axial orientation indicating circuit. A prime superscript, e.g. 188', has been utilized on all the numerical designations of the horizontal orientation indicating circuit to differentiate this circuit from the axial orientation indicating circuit.

The collector electrodes of the transistors 206, 206', 210, and 210' are connected to one input terminal of a suitable conventional four input terminal AND gate 220. The output signal from the AND gate 220 is applied to the base electrode of a conventional NPN transistor 222, the emitter electrode of which is grounded and the collector electrode of which is connected through a current limiting resistor 224 and a light emitting diode 226 to the positive 15 volt d.c. source.

In operation, the output signal from the output terminal 112 of the axial orientation detector is amplified and provided at an output terminal of the aiming tool as the axial orientation signal. Likewise, the output signal from the output terminal 112' of the horizontal orientation detector is amplified through the amplifier 186 and provided at an output terminal of the aiming tool as the horizontal orientation signal.

The signal from the axial and horizontal orientation detectors are also applied to the level detectors 190, 194 and 190', 194' for comparison with selected positive and negative reference signals. Assuming that the headlamp is aimed up and to the right, the signals from the horizontal and axial orientation detectors may, for example, be positive. If the signal from the horizontal orientation detector exceeds the reference level applied to the level detector 190', the transistor 206' is triggered into conduction and the light emitting diode 214' is lighted indicating that the aiming tool (and therefore the headlamp) is too high relative to the true horizontal. Likewise, if the positive signal from the axial orientation detector exceeds the reference level applied to the amplifier 190, the transistor 206 is triggered into conduction lighting the light emitting diode 214 and indicating that the aiming tool (and thus the headlamp) is pointed to the right of the longitudinal axis of the vehicle.

In addition, the collector electrodes of each of the transistors 206, 206', 210, and 210' are monitored by the AND gate 220 and if all of these electrodes are at a high signal level indicating that all of the light emitting diodes 214, 214', 218, and 218' are de-energized, the AND gate 220 provides an output signal which triggers the transistor 222 causing the light emitting diode 226 to be energized. Of course, if all of the light emitting diodes 214, 214', 218, and 218' are extinguished, the diode 226 is energized indicating that a null condition exists.

It may also be desirable to provide an alarm or other indication whenever the aiming tool is disconnected from the headlamp while any one of the indicator lights other than the null light is energized, i.e. whenever the headlamp is not properly aimed at the time the aiming tool is removed. For this purpose, a misalignment indicator or counter (not shown) may be provided.

For example, a switch responsive to the depression of the aiming tool release valve button 43 (FIG. 1) may provide a signal indicating that the aiming tool is being released from engagement with the headlamp. This signal may be applied to a conventional two input terminal AND gate together with the output signal from the lamp driver 172 which drives the null indicator lamp 174 of FIG. 8. If the release valve button is depressed and the null indicator lamp 174 is lighted, the output signal from the AND gate will be a binary ZERO of low (ground signal level since the output signal from the lamp driver 172 is a binary ZERO signal level. However, when the null indicator lamp is not lighted, a binary ONE or high signal level is provided at the output of the AND gate when the release button 43 is depressed.

The output signal from the AND gate may therefore be used to trigger an alarm or a counter to thereby provide an indication or a record of misalignment.

SUMMARY OF ADVANTAGES AND SCOPE OF THE INVENTION

In view of the foregoing description, it should now be appreciated that other alignment operations may be advantageously effected utilizing the disclosed orientation detecting and adjusting techniques.

For example, the axial detector assembly 74 shown in FIG. 4A may be adjustably mounted on a platform which is in turn secured to a front road wheel of an automobile as is more fully described in the previously referenced Hopkins U.S. Pat. No. 3,533,699. The light source 70 may be independently and securely positioned directly beneath the detector assembly 74 with the wall 90 of the detector assembly horizontally disposed and the axis 91 along the wall 90 disposed generally parallel to the longitudinal axis of the vehicle. The detector assembly may then be offset by a predetermined angle with respect to the horizontal by rotating the assembly about its pivot axis 116 and the output signal from the detector assembly may be utilized to effect adjustment of wheel camber either automatically (e.g. with a motor driven wrench) or manually (e.g. using a hand wrench and adjusting wheel camber responsively to an audible or visible alignment indicator.

Both the detector assembly 74 and the platform may then be rotated 90° as is disclosed in the Hopkins U.S. Pat. No. 3,533,699 for alignment of wheel toe-in. In making this adjustment, the detector assembly 74 cooperates with a light source positioned laterally to one side of the vehicle and generally coaxially with the wheel axle. The desired toe-in offset may then be preset by pivotally adjusting the detector assembly 74 and the adjustment of wheel toe-in may be effected either automatically or manually.

It can also be seen that the horizontal orientation detector assembly 120 of FIG. 7 may be utilized, for example, to adjust the chamber of vehicle road wheels. The horizontal orientation detector 120 of FIG. 7 may be mounted on the platform secured to the wheel so that the housing 122 of the detector assembly is generally perpendicular to the longitudinal axis of the vehicle.

The detector assembly may then be preset to the desired camber angle and either automatic or manual adjustment of the camber of the wheel may be effected in response to the output signal from the detector assembly 120.

In addition to automobile alignment operations, a number of other alignment operations may be advantageously effected utilizing the orientation detectors of the present invention. An example of one such alignment operation is the alignment of a serveyors transit at predetermined angular orientations relative to the true horizontal. The horizontal orientation detector 120 may be readily adapted for this purpose.

Other advantages of the present invention are also readily apparent from the foregoing description. For example, it can readily be seen that the aiming system may be easily employed for all types of aiming operations. The orientation of the device being aligned is automatically sensed and may be modified with little or no operator intervention.

The orientation detectors according to the present invention are very accurate and are readily adaptable for alignment operations at speeds consistant with assembly line speeds. For example, the level or horizontal orientation detector assembly is relatively insensitive in that the radius of curviture of the housing is relatively small. The bubble therefore rapidly assumes a very stable position preventing the hunting or oscillation of the closed loop adjusting circuit. However, the relative insensitivity of the level means is compensated by the extremely high sensitivity of the disclosed bubble position detector assembly.

The axial orientation detector of the present invention is particularly advantageous in a number of respects. For example, accurate headlamp alignment may be achieved even though the headlamps or other devices being aligned are intially badly canted relative to the longitudinal axis of the vehicle or other axis or plane to which the alignment is referenced. Moreover, the axial orientation detector is not complex and may be manufactured at a minimal cost.

Other advantages of the invention include, for example, the adjustability of the detector assemblies, the analog and the "go-no go" orientation indicator capabilities and the misalignment indicator and/or counter capabilities, all of which add to the ease which the present invention may be utilized and the versitility thereof.

Although the invention has been described with reference to certain preferred embodiments, it will be appreciated by those skilled in the art that many additions, deletions, substitutions, modifications, and other changes may be made which will fall within the purview of the appended claims.

What is claimed is:

1. Apparatus for aiming a vehicle headlamp of the type including means defining a reference surface having a predetermined orientation relative to an optical axis of the headlamp, the apparatus comprising:
   aiming means having an aiming axis and adapted to be retained in engagement with the reference surface defining means on the headlamp, the aiming axis of said aiming means thereby being disposed at a predetermined orientation relative to the reference surface;
   first means, carried by said aiming means in a predetermined orientation relative to said aiming axis, for detecting the orientation of said aiming axis relative to the true horizontal and generating a first electrical signal related thereto;

second means carried by said aiming means in a predetermined orientation relative to said aiming axis, for detecting the orientation of said aiming axis relative to the longitudinal axis of the vehicle and generating a second electrical signal related thereto;

adjusting tool means responsive to a selected one of said first and second electrical signals for modifying one of the position of the vehicle headlamp relative to the true horizontal and the position of the vehicle headlamp relative to the longitudinal axis of the vehicle; and, a position responsive switch means carried by said adjusting tool means, said one of said first and second signals being automatically selected responsively to the position of said switch means.

2. Apparatus for aiming a vehicle headlamp of the type adjustably mounted on a vehicle, the adjustable mounting including first and second headlamp adjusting means for adjusting the headlamp relative to the longitudinal axis of the vehicle and relative to the true horizontal, respectively, the apparatus comprising:

means for detecting the orientation of the headlamp relative to the true horizontal and generating a first signal related thereto;

means for detecting the orientation of the headlamp relative to the longitudinal axis of the vehicle and generating a second signal related thereto;

an adjusting tool adapted to be positioned in engagement with the first and second headlamp adjusting means;

means for automatically selecting one of the first and second signals in response to the position of the adjusting tool; and, means for applying the selected one of the first and second signals to the adjusting tool.

3. Apparatus for aligning vehicle headlamps of the type provided with means defining an outwardly facing reference surface, the apparatus comprising:

frame means including means, carried adjacent one end thereof, defining a seating surface for matingly abutting the reference surface of the vehicle headlamp;

sensing means for sensing the orientation of said seating surface relative to said reference surface of the vehicle headlamp;

suction means carried by said frame means and selectively operable to releasably retain said seating surface of said frame means in abutment with the reference surface of the vehicle headlamp by suction force;

suction venting means responsive to said sensing means for reducing said suction force;

first detector means carried by said frame means for detecting the orientation of the reference surface relative to the true horizontal;

second detector means carried by the frame means for detecting the orientation of the reference surface relative to a longitudinal axis of the vehicle;

circuit means selectively connectable to said first and second detector means for generating a signal related to the orientation detected by said detector means selectively connected thereto; and, adjusting tool means responsive to said signal for adjusting the orientation of said reference surface relative to the true horizontal and the longitudinal axis of the vehicle, the position of said adjusting tool means automatically controlling the selective connection of said detector means to said circuit means.

* * * * *